US005775301A

United States Patent [19]

Ganser

[11] Patent Number: 5,775,301

[45] Date of Patent: Jul. 7, 1998

[54] FUEL INJECTION VALVE FOR INTERNAL COMBUSTION ENGINES

[75] Inventor: Marco A. Ganser, Zürich, Switzerland

[73] Assignee: Ganser-Hydromag AG, Zurich, Switzerland

[21] Appl. No.: 872,077

[22] Filed: Jun. 10, 1997

Related U.S. Application Data

[63] Continuation of Ser. No. 657,252, Jun. 3, 1996, Pat. No. 5,694,903.

[30] Foreign Application Priority Data

Jun. 2, 1995 [CH] Switzerland .......................... 01628/95

[51] Int. Cl.[6] ............................ F02M 41/00; F16K 32/02

[52] U.S. Cl. ....................................... 123/467; 251/129.15

[58] Field of Search ..................................... 123/467, 496, 123/506, 446–7; 251/129.15; 239/96

[56] References Cited

U.S. PATENT DOCUMENTS

| | | | |
|---|---|---|---|
| 4,603,671 | 8/1986 | Yoshinaga et al. | 123/467 |
| 4,719,889 | 1/1988 | Amann et al. | 123/447 |
| 5,156,132 | 10/1992 | Iwanaga | 123/496 |
| 5,263,649 | 11/1993 | Babitzka | 251/129.15 |
| 5,302,930 | 4/1994 | Brehm | 251/129.15 |
| 5,395,048 | 3/1995 | Ricco et al. | 239/96 |
| 5,441,028 | 8/1995 | Felhofer | 123/456 |
| 5,472,142 | 12/1995 | Iwanaga | 239/96 |
| 5,526,791 | 6/1996 | Timmer et al. | 123/467 |
| 5,664,545 | 9/1997 | Kato et al. | 123/467 |
| 5,671,715 | 9/1997 | Tsuzuki | 123/467 |

FOREIGN PATENT DOCUMENTS

| | | |
|---|---|---|
| 0 228 578 | 12/1987 | European Pat. Off. . |
| 0 262 539 | 4/1988 | European Pat. Off. . |
| 985.567 | 2/1949 | France . |
| 1026572 | 3/1958 | Germany . |
| 3442022 A1 | 11/1984 | Germany . |
| 3906205 A1 | 8/1990 | Germany . |
| 2152135 | 11/1984 | United Kingdom . |

*Primary Examiner*—Thomas N. Moulis
*Attorney, Agent, or Firm*—McDermott, Will & Emery

[57] ABSTRACT

A fuel injection valve (1; 2) for the intermittent injection of fuel into the combustion chamber of an internal combustion engine is equipped with a hydraulic control device (15; 100). The opening or closing of a control bore (61; 109) is brought about by means of an electrically controlled solenoid valve (5; 6; 7), with the result that a control pressure in a control chamber (60; 114) is influenced, thus causing the opening or closing of injection ports into the combustion chamber via a control piston (30; 110) and an injection-valve member (24). The injection event is controlled additionally by controlling the movement of a solenoid-valve pilot-valve stem (70; 125) assigned to the control bore (61; 109). Means, by which the opening movement of the injection valve member (24) takes place in two successive phases, are provided. As a result of this additional control, at any given system pressure and with the construction remaining the same, the time trend of the injection event can be adapted in an optimum manner to the conditions demanded by the internal combustion engine and the operating behavior can be improved.

9 Claims, 8 Drawing Sheets

FUEL INJECTION VALVE FOR INTERNAL COMBUSTION ENGINES

This is a continuation of copending U.S. application Ser. No. 08/657,252, filed on Jun. 3, 1996, and allowed on Jan. 8, 1997.

TECHNICAL FIELD OF THE INVENTION

The present invention relates to a fuel injection valve for the intermittent injection of fuel into an internal combustion engine.

BACKGROUND OF THE RELATED ART

Fuel injection valves of this type are known, for example, from Patent Specifications EP 0,262,578 and EP 0,262,539.

In these known fuel injection valves, the control of the opening and closing movement of the injection valve takes place solely by regulating the control space pressure. The opening and closing speed of the injection valve is dependent on the system pressure, with movement of the injection valve faster at a high fuel pressure than at a low fuel pressure. During each switching operation of a solenoid valve within the fuel injection valve, a pilot-valve stem executes a constant movement at a given rate.

Consequently, in the case of a given system pressure and a given valve construction, the rate of the injection event is predetermined and can no longer be influenced.

DISCLOSURE OF THE INVENTION

The object of the present invention is to provide a fuel injection valve which makes it possible, at any given system pressure, to adapt the rate of the injection event in an optimum manner to the conditions demanded by the internal combustion engine.

Because the injection operation can be controlled additionally by controlling the movement of the pilot-valve stem of the solenoid valve, an appreciable improvement in the operating behavior of the injection valve can be achieved.

Figure 1:
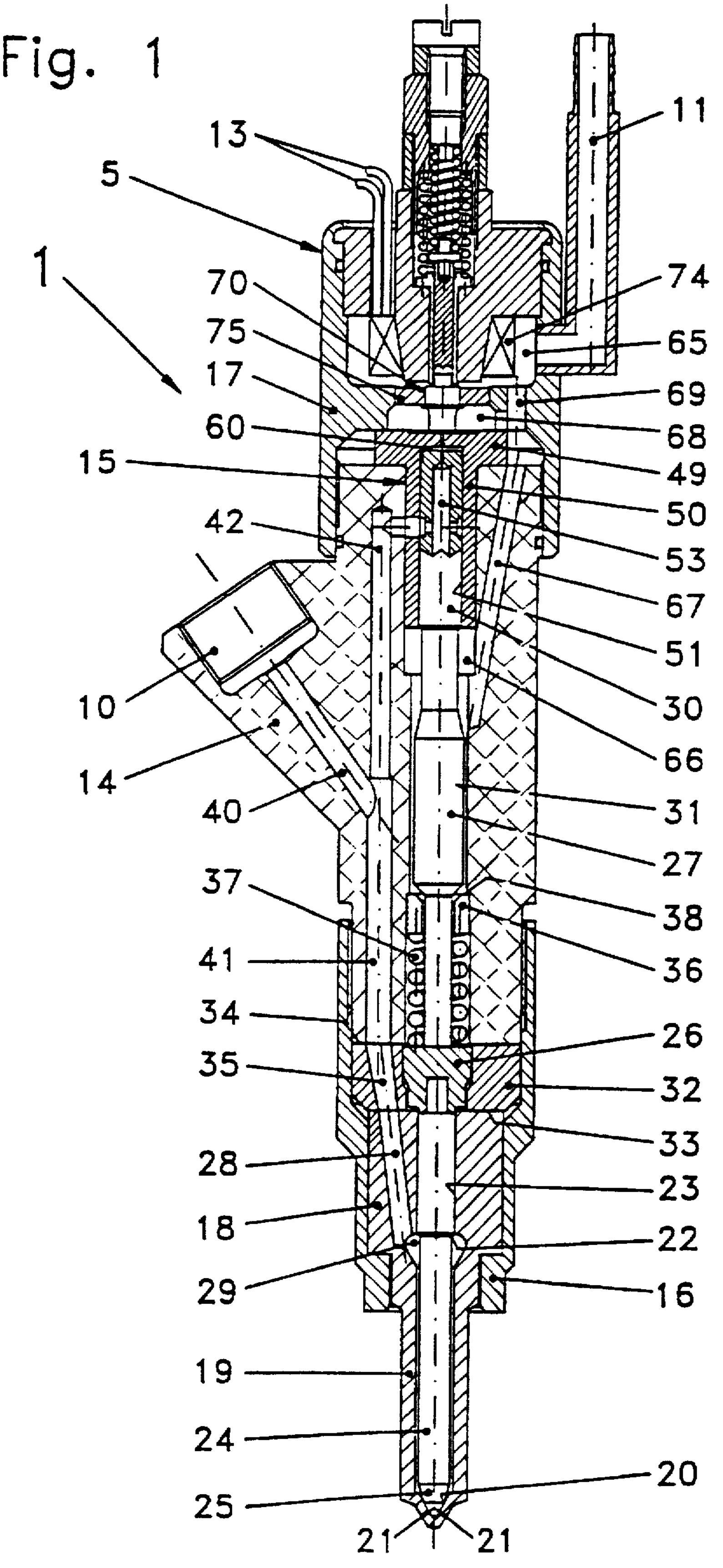
FIG. 1 shows a first embodiment of a fuel injection valve in longitudinal section.
Figure 2:
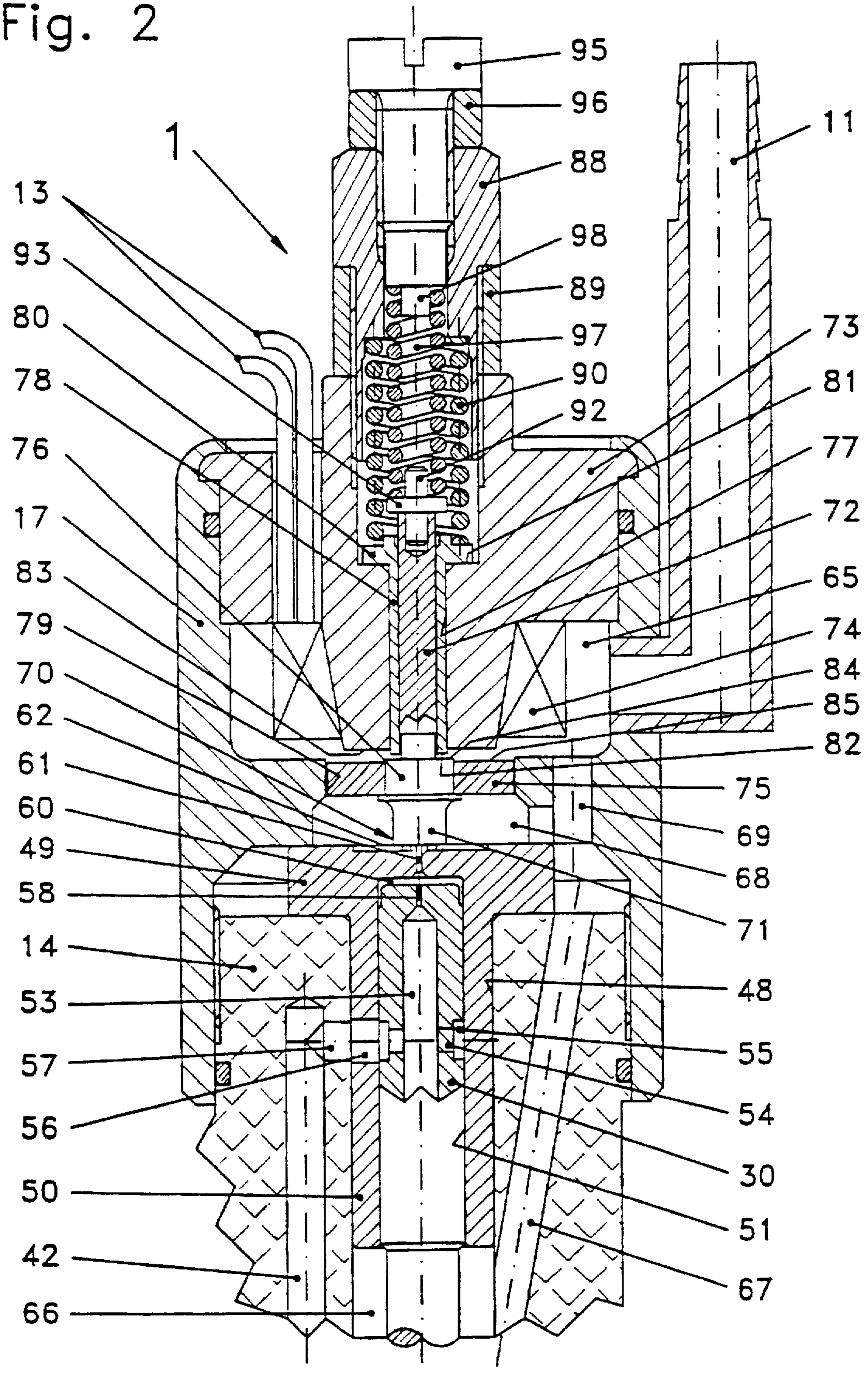
FIG. 2 shows an enlarged partial longitudinal section through the fuel injection valve according to FIG. 1 with a solenoid valve and with control members for controlling the injection operation.
Figure 5:
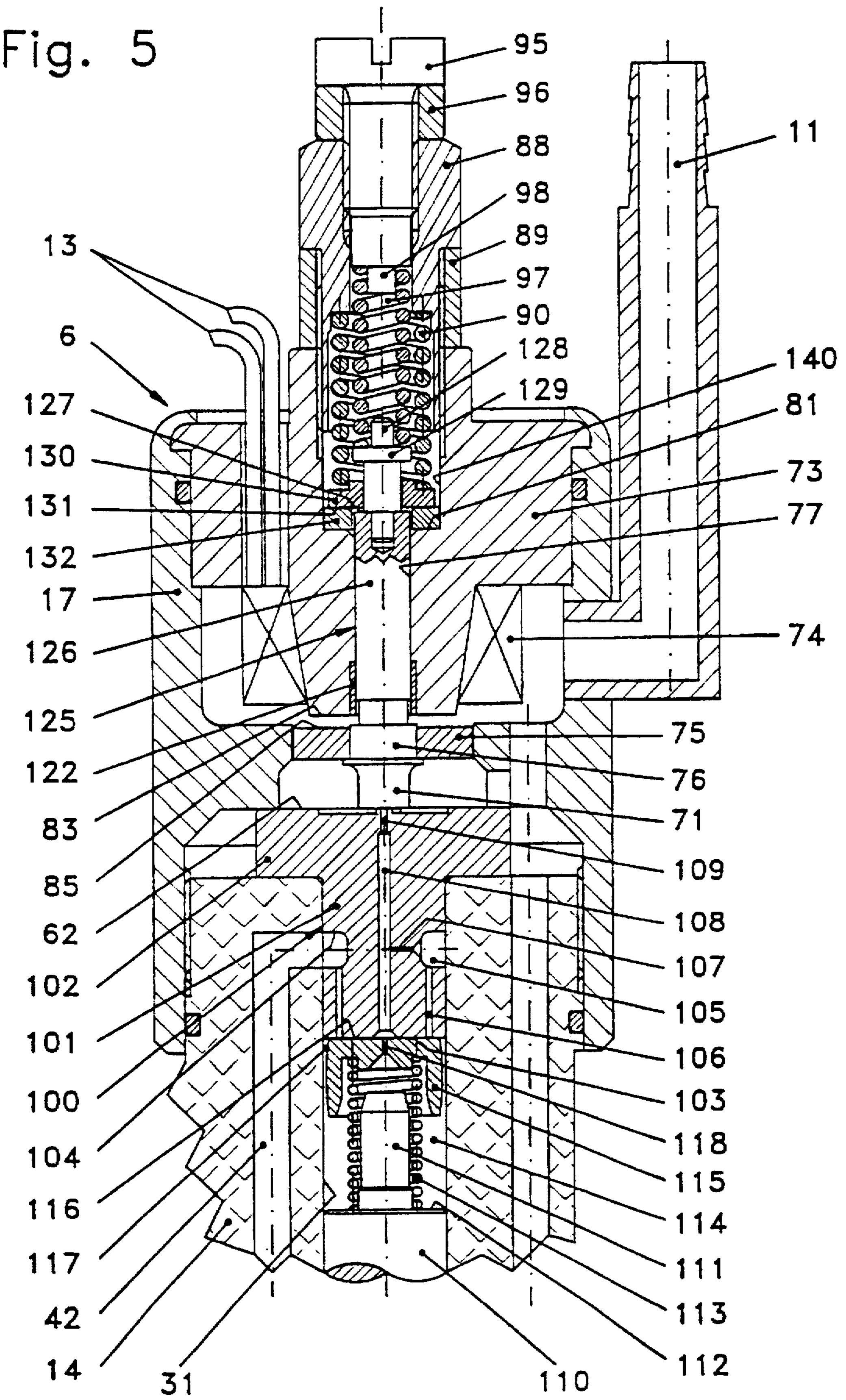
Figure 6:
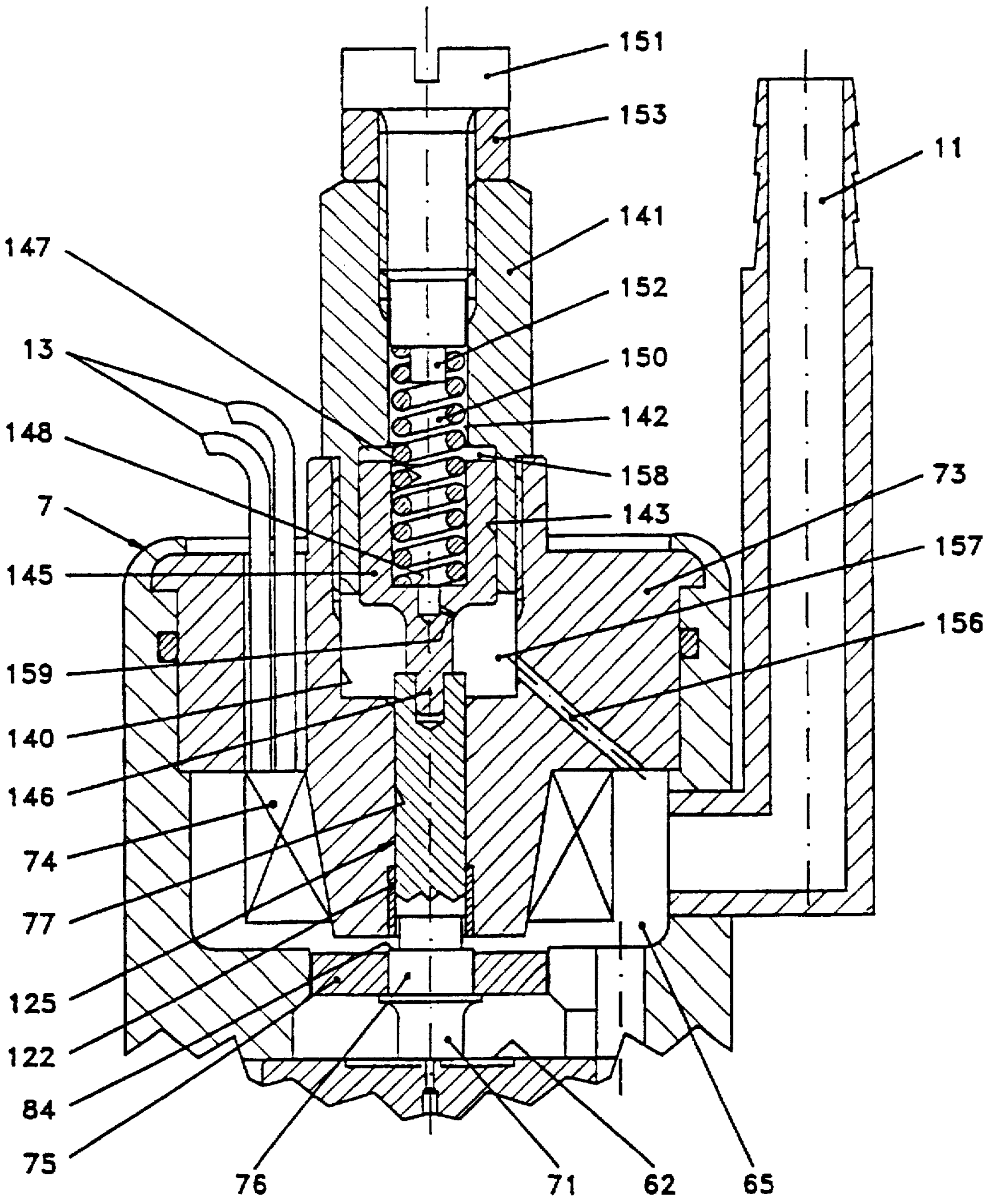

FIGS. *3a*, *3b* and *3c* show three phases of the relative position of the solenoid valve and of the control members according to FIG. 2 in the form of a detail from FIG. 2 on an enlarged scale;

FIG. *4a* shows a diagram which represents a time trend of the current of the electromagnetic control of the fuel injection valve shown in FIGS. 1 and 2;

FIG. *4b* shows a diagram which represents a time trend of the movement of the solenoid valve shown in FIGS. 1 and 2;

FIG. *4c* shows a diagram which represents a time trend of the movement of the control piston for controlling the injection operation shown in FIGS. 1 and 2;

FIG. 5 shows a representation, corresponding to that of FIG. 2, of a second embodiment of the fuel injection valve with a second embodiment of the solenoid valve;

FIG. 6 shows a third embodiment of the solenoid valve which can be used for both embodiments of the fuel injection valve shown in FIG. 2 or FIG. 5;

FIG. *7a* shows a diagram which represents a time trend of the current of the electromagnetic control of the fuel injection valve shown in FIG. 6;.

Figure 9:
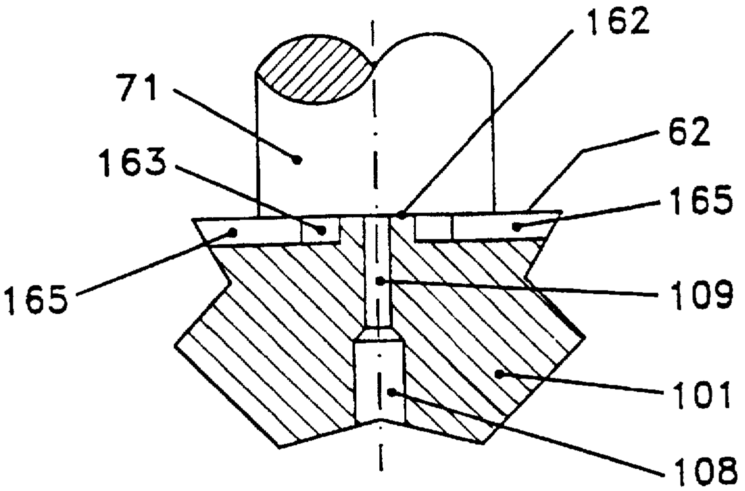
Figure 8:
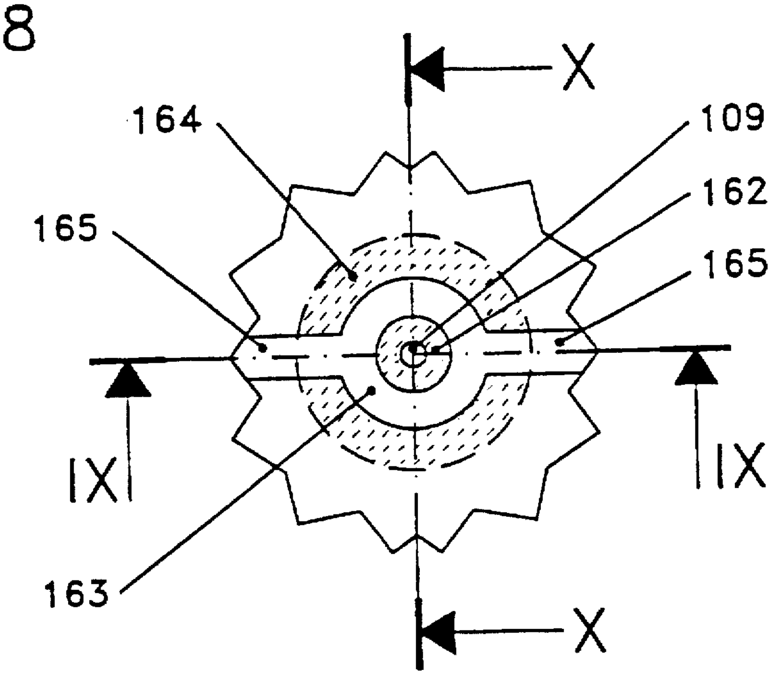
Figure 10:
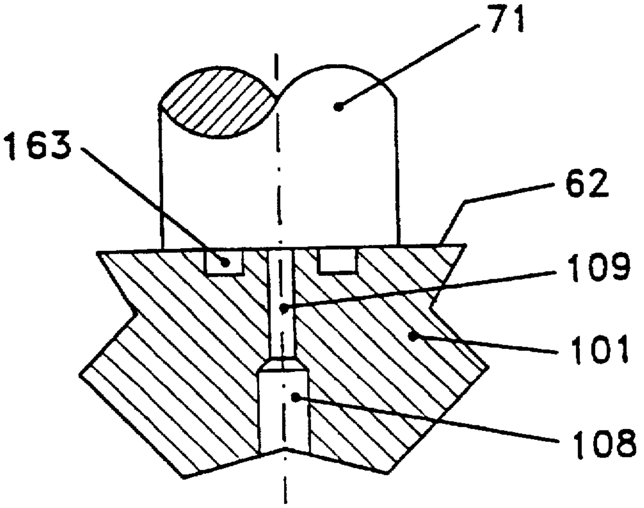

FIG. *7b* shows a diagram which represents a time trend of the movement of the solenoid valve shown in FIG. 6;

FIG. *7c* shows a diagram which represents a time trend of the movement of the control piston for controlling the injection operation shown in FIG. 6;

FIG. 8 shows a flat seat between a solenoid-valve stem and a control body in cross-section;

FIG. 9 shows a section along the line IX—IX in FIG. 8;

FIG. 10 shows a section along the line X—X in FIG. 8.

BEST MODE FOR CARRYING OUT THE INVENTION

FIG. 1 shows a fuel injection valve 1 assembly having an inlet high-pressure fuel port 10 mechanically connected to a high-pressure fuel feed device and a low pressure fuel return port 11. Electrical connections 13 of the fuel injection valve receive signals from an electronic controller. The high-pressure feed device and the electronic controller are not shown in the drawing.

The housing 14 of the fuel injection valve 1 has generally an upper end and a lower end. The upper end is mechanically connected to an outer part 17 of a solenoid valve 5. The lower end is mechanically connected to a holding part 16. The holding part 16 may be in the form of a union nut.

Inserted in the holding part 16 is a nozzle body 18 having a nozzle tip 19, is inserted in the holding part 16 such that the nozzle tip 19 projects from the holding part 16. The nozzle tip 19 is provided with a nozzle-needle seat 20, and has a plurality of injection ports 21. An axially adjustable nozzle needle 24 forms an injection valve member, and is slideable within the nozzle body 18 along a needle-guide bore 23. The injection ports 21 of the nozzle tip 19 can be closed off using a lower end 25 of the nozzle needle 24. The nozzle needle 24 is operatively connected to a control piston 30 via an intermediate element 26 and a connecting rod 27. The connecting rod 27 is axially movable within a central bore 31 of the housing 14. Movement of the control piston 30 and also the nozzle needle 24 is controlled by means of a control device 15 which cooperates with the solenoid valve 5.

A sealing plate 32, receiving the intermediate element 26, is arranged between the nozzle body 18 and the housing 14 and is firmly clamped by the holding part 16. A first sealing face 33 is formed between the nozzle body 18 and sealing plate 32, and a second sealing face 34 is formed between the sealing plate 32 and housing 14.

A precompressed nozzle-needle spring 37 is arranged between a spring tension disc 36 and the needle intermediate element 26. A step 38 of the housing 14 supports the spring tension disc 36.

Fuel entering the high pressure fuel port 10 is fed into a first fuel supply bore 40, continuing into a lower high pressure supply conduit 41 and an upper high pressure supply conduit 42, both arranged generally parallel to the bore 31. The upper high pressure supply conduit 42 leads to the control device 15. The lower high-pressure supply conduit 41 is mechanically connected, via a connecting bore 35 arranged obliquely within the sealing plate 32, to a first end of a nozzle body bore 28. A second end of the nozzle body bore 28 terminates and opens into an annular space 29 within the nozzle body 18. The fuel passes from the annular space 29 to the nozzle needle seat 20 or to the injection ports 21. In the region of the annular space 29, the nozzle needle 24 is provided with a step 22.

A control body 50 of the control device 15 is inserted into the central bore 31. The control body 50 has a flange 49 which is firmly held by outer part 17 of the solenoid valve 5. The control body 50 has a guide bore 51, in which the control piston 30 is arranged in a close fit so as to be axially displaceable and slideable. The control piston 30 is provided with a central bore 53 which is connected to the upper high pressure supply conduit 42 through a transverse bore 54 and an annular groove 55 in the control piston 30, continuing on through transverse bore 56 in the control body 50, and further continuing on through transverse bore 57 in the housing 14, see FIG. 2. The central bore 53 of the control piston 30 is connected at the upper end to a first control bore 58 which opens into a control chamber 60 located between the control piston 30 and the control body 50 on the end face relative to the control piston 30 and which connects the control chamber 60 to the high-pressure zone. The control body 50 is provided with a second control bore 61 connecting the control chamber 60 to an end face 62 of the control body 50 and which, in the position represented in FIGS. 1 and 2, is closed by a pilot-valve stem 70.

The fuel flowing out from the second control bore 61 when the pilot-valve stem 70 is raised is collected in a flow-off space 68. Fuel which has accumulated as a result of leakages in a space 66, located underneath the control body 50, is also allowed to flow into the flow-off space 68 via a relief bore 67. Some of the fuel is therefore returned, virtually pressureless, to the high pressure fuel feed device. The space 66, relief bore 67, flow-off space 68, flow-off bore 69 and a further flow-off space 65 connected to the flow-off bore 69 form, along with the adjoining fuel return port 11, the so-called low-pressure part of the fuel injection valve 1. The control body SO is preferably installed within the guide bore 48 using a light press fit or a close sliding fit so that no appreciable leakage can occur. However, other fuel-tight connections could also be made, for example by the use of suitable sealing rings.

According to FIG. 2, an inner part 73 is inserted into the outer part 17 of the solenoid valve. A coil 74 is connected to the electronic controller, not shown, via the electrical connections 13. The solenoid valve consists of an armature 75 and of the pilot-valve stem 70, the armature 75 being firmly connected to the pilot-valve stem 70.

The part of the pilot-valve stem 70 receiving the armature 75 is designated by 76. An upper step face 84 of the pilot-valve stem 70 is somewhat higher than the upper end face 85 of the armature 75, as can be clearly seen in the FIGS. 3*a*, 3*b* and 3*c*, designated as the distance L1. The pilot-valve stem 70 is made from a hard material and the armature 75 from soft-electromagnetic material.

An upper part 72 of the pilot-valve stem 70 projects axially into a sleeve-shaped, a stroke stop 78. The stroke stop 78 is inserted axially movable into a central bore 77 of the inner port 73. A closing-off end 71 of the pilot-valve stem 70 is a closing off to the second control bore 61. The armature 75 axially movable together with the pilot-valve stem 70, is arranged displaceably in a bore 79 of the outer part 17.

Figure 3A:
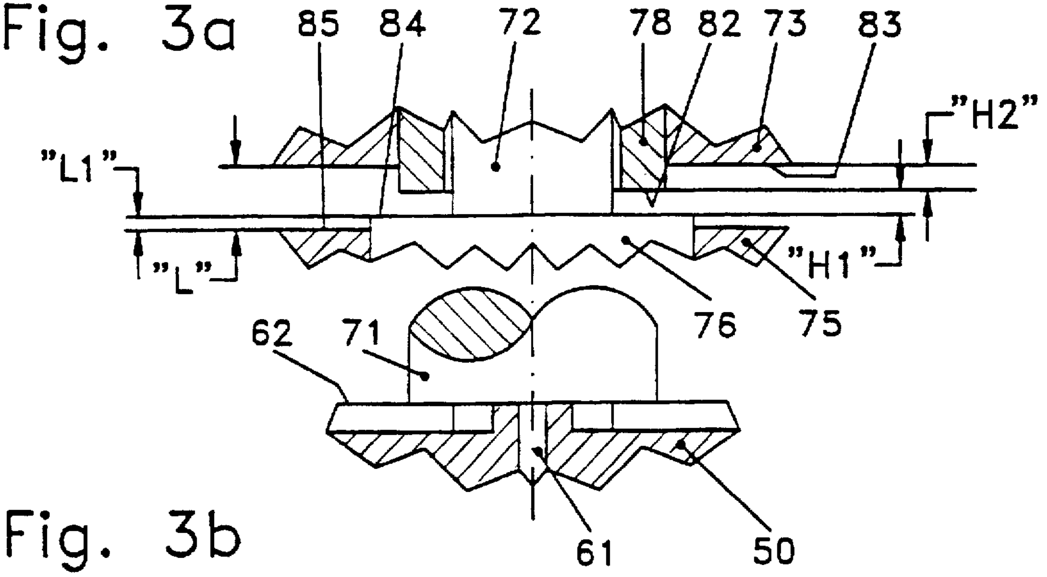

The axially movable stroke stop 78 has a flange 80. In the position represented in FIG. 2, the flange 80 bears on a step 81, the lower end of the stroke stop 78 projecting with its lower end face 82 out of the inner part 73. FIG. 3*a* corresponds to the position of the fuel injection valve 1 shown in FIGS. 1 and 2, the projecting distance of the stroke stop 78 being designated as H2. In FIG. 3*a* a pole face of the inner part 73 of the solenoid valve is designated by 83.

An adjusting screw 88, to which a spacer disc 89 is assigned, is screwed into the inner part 73 of the solenoid valve. A precompressed spring 90 coaxial with the pilot-valve stem 70 is located between the adjusting screw 88 and the flange 80 of the stroke stop 78.

A stud 92, provided with a shoulder 93, is inserted into the upper part 72 of the pilot-valve stem 70. A precompressed spring 97 is located between the shoulder 93 and a setscrew 95. The setscrew 95 is screwed into the adjusting screw 88. The spring 97 is arranged coaxially to the pilot-valve stem 70 and inside the spring 90. The setscrew 95 is provided with a guide stud 98 for the spring 97, and is also assigned a spacer disc 96.

Figure 3B:
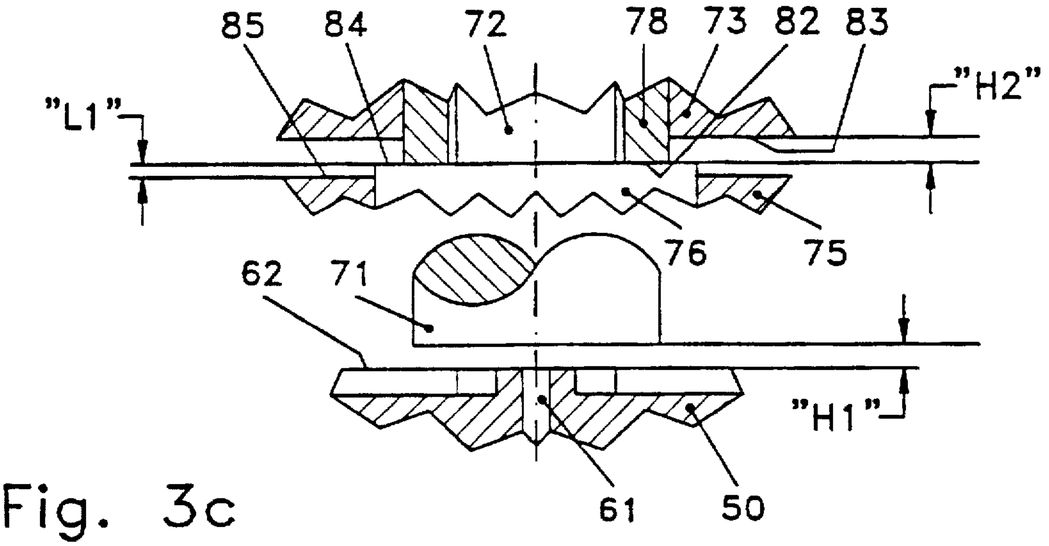
Figure 3C:
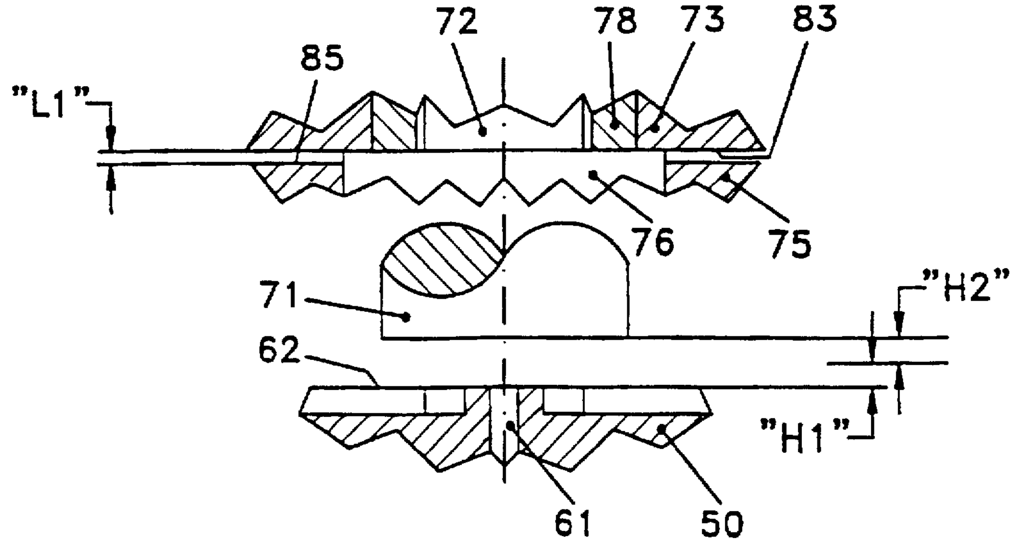

The mode of operation of the fuel injection valve 1 is now described together with the description of FIGS. 3*a*, 3*b* and 3*c* as well as 4*a*, 4*b* and 4*c*.

FIGS. 3*a*, 3*b* and 3*c* show, in three different phases on one side, the relative position of the pilot-valve stem parts 76 and 72, together with the armature 75, the movable stroke stop 78, and of the inner part 73 of the solenoid valve along with the relative position of the closing-off end 71 of the pilot-valve stem 70 in relation to the upper end face 62 or to the control bore 61 of the control body 50 on the other side.

Figure 4A:
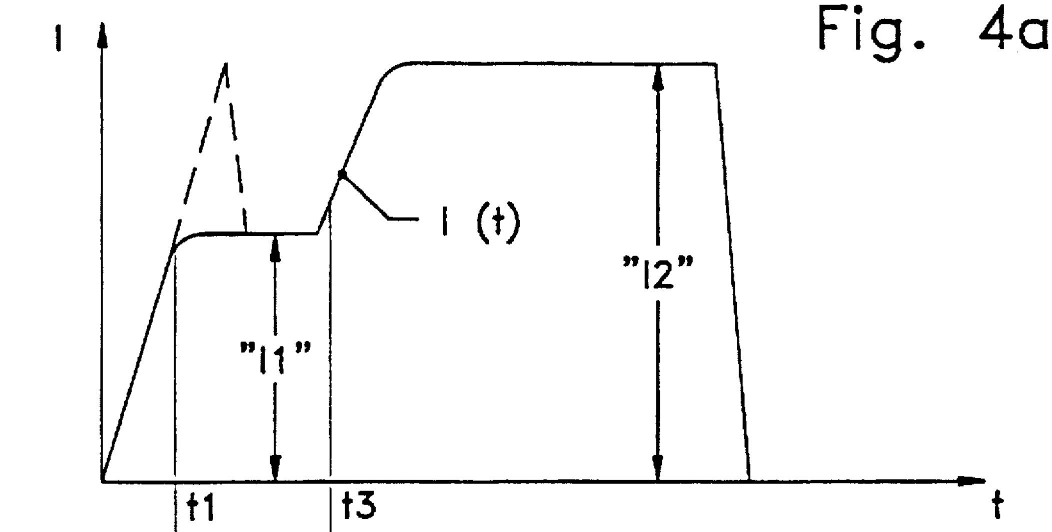
Figure 4B:
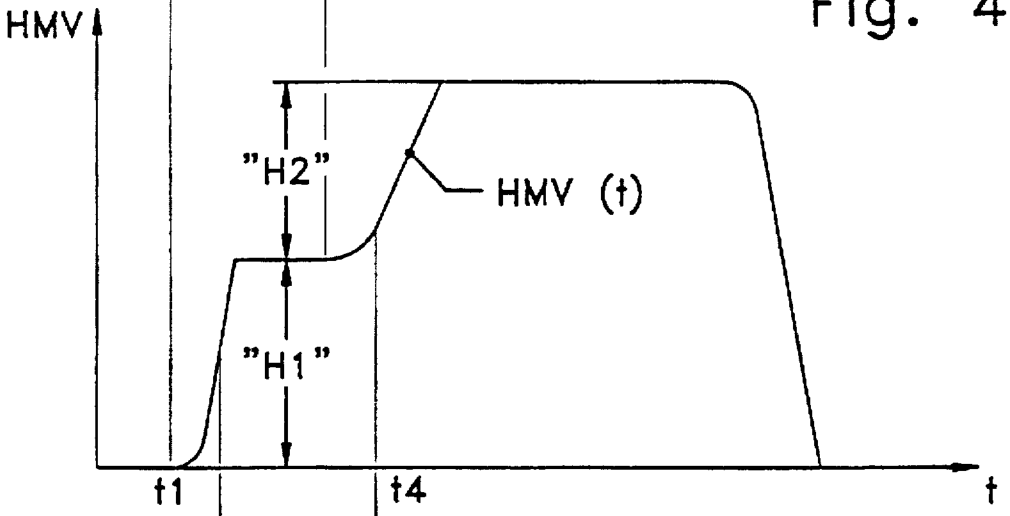
Figure 4C:
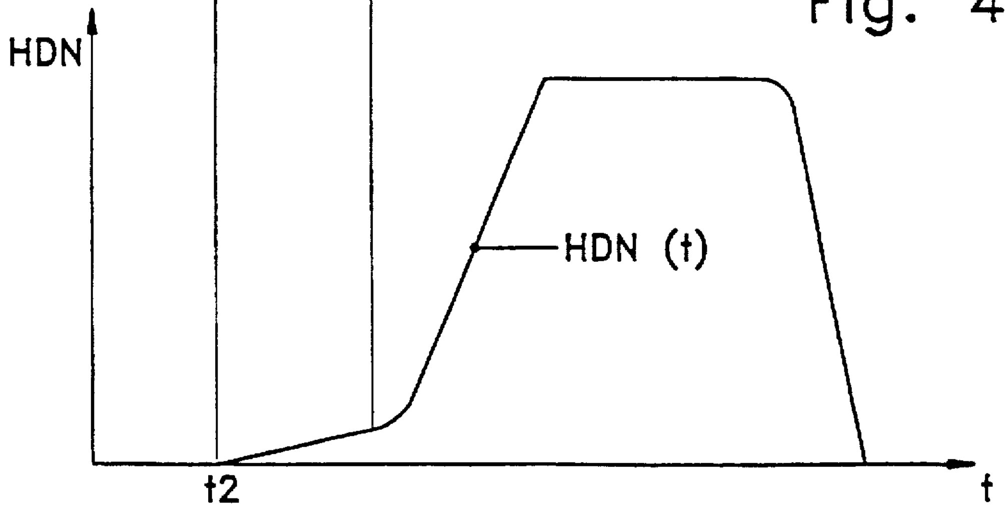

FIGS. 4*a*, 4*b* and 4*c* characterize the time trend of the injection event. FIG. 4*a* shows the amount of current drawn by the solenoid valve 5. FIG. 4*b* shows the stroke of the solenoid valve 5, that is, of the pilot-valve stem 70 and of the armature 75. FIG. 4*c* shows the stroke of the control piston 30 and thus also of the nozzle needle 24.

Prior to the injection event, the same high pressure or injection pressure, which can amount to more than 1500 bar, prevails in the high-pressure part of the fuel injection valve 1 including the fuel supply bore 40, the annular spaces 29, 55 and the control chamber 60. The fuel injection valve 1 is represented in the closed position in FIGS. 1, 2 and 3*a*. As shown in FIG. 3*a*, the upper end face 85 of the armature 75 is at a distance L from the lower pole face 83 of the inner part 73 of the solenoid valve.

At a specific point in time relating to a specific crankshaft position of the engine equipped with the fuel injection valve 1, a first electrical pulse is transmitted to the solenoid valve 5, thereby energizing the coil 74. When the current reaches a given value I1, FIG. 4*a*, the force of the spring 97 holding the armature 75 together with the pilot-valve stem 70 in the closed position is overcome and the armature 75 is pulled upward. The beginning of this movement is designated by the time t1 in FIGS. 4*a* and 4*b*. Together with the pilot-valve stem 70, the armature 75 executes a first stroke Hi (see FIGS. 3*a*,3*b* and 4*b*), whereby the upper part 72 of the pilot-valve stem 70 is being moved upwards in the stroke stop 78, until pilot-valve stem part 76 receiving the armature 75 comes to bear with the step face 84 on the lower end face 82 of the stroke stop 78, and further movement is prevented by the force of the spring 90 acting on the stroke stop 78. This position is represented in FIG. 3*b*. The closing-off end 71 of the pilot-valve stem 70 has likewise been raised by the stroke Hi from the end face 62 of the control body 50, thereby opening the control bore 61. With the opening of the control bore 61, the pressure in the control space 60 decreases. The result of the pressure decreases is that, as a consequence of the fuel pressure prevailing in the annular space 29 and acting on the step 22, the nozzle needle 24 and the control piston 30 are raised from the nozzle-needle seat 20 and begin to move upwardly (see the time t2 in FIG. 4*c*).

The injection ports 21 are opened, and a first phase of the injection operation with slow opening of the nozzle needle 24 takes place.

At a further selectable time (t3 in FIG. 4*a*), a second electrical pulse is transmitted to the solenoid valve 5. The armature 75 and the pilot-valve stem 70, are pulled upwardly with an increased pulling force corresponding to the higher current I2 according to FIG. 4*a*, overcoming both the force of the spring 97, and the force of the spring 90, thereby moving the stroke stop 78 further upwards via the step face 84 of the pilot-valve stem 70. The flange 80 of the stroke stop 78 is raised from the step 81, and the stroke stop 78 is moved into the inner part 73 of the solenoid valve, until the pilot-valve stem part 76 receiving the armature 75 bears with its step face 84 on the inner part 73. In order to reach the position shown in FIG. 3*c*, the pilot-valve stem 70 together with the armature 75 executes the second stroke designated by H2 in FIGS. 3*b* and 4*b*. The closing-off end 71 of the pilot-valve stem 70 also moves further away from the end face 62 of the control body 50 by the stroke H2, thereby increasing the cross-section of the fuel throughflow. The pressure decrease in the control space 60 is thereby accelerated and the nozzle needle 24 is moved faster in an upwardly direction (from the time t4 in FIGS. 4*b* and 4*c*). This describes a second phase of the injection event, with rapid opening of the nozzle needle 24 taking place.

The small gap L1 between the armature 75 and the lower pole face 83 of the solenoid valve inner part 73, even in the uppermost position of the armature 75 (FIG. 3*c*), generates a rapid response of the solenoid valve 5 when the current is switched off. The closed position of the fuel injection valve 1 can thus occur rapidly.

The subdivision of the injection event in two phases brings about an appreciable improvement in the operating conditions of the engine in terms of noise emission and the emission of pollutants. The fuel quantity injected per unit time can be controlled as desired and be adapted in an optimum manner to the conditions demanded by the engine. The time of transition from the first phase to the second is freely selectable. A single-stage injection event can, of course, also be implemented, by setting the current to the second value I2 immediately.

In order to ensure that the solenoid valve 5 responds reliably for the first stroke movement, the current pulse can be selected briefly higher than I1, as represented by broken lines in FIG. 4*a*.

FIG. 5 shows another embodiment of a fuel injection valve 2 which is provided with a solenoid valve 6 and with a control device 100. The lower part of the injection valve is not shown in the drawing it can be of the same design as the corresponding part of the fuel injection valve 1 shown in FIGS. 1 to 3*c* and which are identical and have the same effect continue to be designated by the same reference numerals.

The control device 100 has a control body 101 which is inserted into the central bore 31 with a press fit or with a closely matched sliding fit, and is firmly held at its upper flange 102 by the outer part 17 of the solenoid valve 6. A control piston 110 is operatively connected at a first end to the nozzle needle 24 and is closely matched to the guide bore 31 so as to be axially displaceable. The control piston 110 has at the upper end an end portion 111 having a smaller diameter, resulting in a step face 112. A control chamber 114 is formed within the guide bore 31, and is limited axially by the step face 112 and by a lower seat face 103 of the control body 101.

Arranged in the guide bore 31 or in the control chamber 114 and axially movable is an intermediate part 115 which, in the position shown, is pressed with an upper seat face 116 onto the lower seat face 103 of the control body 101 by a precompressed spring 113, the spring 113 surrounding the end portion 111. An annular space 117 is defined between the intermediate part 115 and the guide bore 31.

The control body 101 is provided with an annular circumferential groove 104, by which an annular space 105 connected to the upper high-pressure supply conduit 42 is formed. A number of bores 106 connect the annular space 105 to the seat face 103. Furthermore, the annular space 105 or the circumferential groove 104 is connected via a small bore 107 to a central bore 108 which is coaxial with the longitudinal axis of the fuel injection valve 2. The control bore 108 narrows at one end, connecting to a control bore 109 which opens into the upper end face 62 of the control body 101. The control bore 109 corresponds functionally to the second control bore 60 according to FIG. 2. This upper end face 62 of the control body 101 is designed identically to that of the pressure control element 50 according to FIG. 2. The exact design of this end face 62 is described in more detail later with reference to FIGS. 8 to 10.

The intermediate part 115 contains a small, centrally arranged control bore 118 which connects the control chamber 114 to the bore 108 and therefore also, via the small bore 107, to the high-pressure zone.

A pilot-valve stem 125 is arranged axially movable with its upper part 126 in the central bore 77 of the inner part 73 of the solenoid valve 6. The lower part of the pilot-valve stem 125 is of the same design as the pilot-valve stem 70 shown in FIG. 2. A stop element 122 made of wear-resistant material is inserted in the bore 77 at the bottom; this stop element is preferably also used in the embodiment of the solenoid valve 5 represented in FIG. 2.

Inserted into the upper part 126 of the pilot-valve stem 125 is a stud 128, which is provided with a shoulder 129 onto which the spring 97, precompressed by the setscrew 95, is resting, in the same way as in FIG. 2.

Arranged around the stud 128 is a stop plate 130 which is pressed by the spring 90, the pressure force of which can be set by the adjusting screw 88, onto a spacer disc 132 arranged between the stop plate 130 and the step 81. In the closed position of the pilot-valve stem 125 represented in FIG. 5, a distance corresponding to the first stroke H1 is present between an upper end face 127 of the pilot-valve stem 125 or of its part 126 and a lower end face 131 of the stop plate 130.

The following mode of operation of the fuel-injection valve 2 results from the design described:

The injection event takes place in two stages essentially in the same way as in the fuel injection valve 1. In the first phase, when the first current pulse is fed to the solenoid valve 6, the pilot-valve stem 125 is raised for the first stroke Hi against the force of spring 97, until the upper end face 127 comes to bear on the lower end face 131 of the stop plate 130, the stop plate 130 being pressed downwards by the spring 90. The dimension of the first stroke Hi is fixed selectively by choice of the thickness of the spacer disc 132.

As a result of raising the pilot-valve stem 125, the control bore 109 is opened and the pressure is decreased in the control chamber 114. The nozzle needle is also raised, and the first phase of injection takes place. By increasing the current intensity and thus the pull-up force in the second phase, the downward force of the spring 90 is overcome, and the pilot-valve stem 125 connected to the armature 75 executes the second stroke H2, resulting in a pressure decrease in the control chamber 114. The resulting upward movement of the nozzle needle is thereby accelerated.

Termination of the injection operation is accomplished when the supply of current to the solenoid valve 6 is interrupted by the controller, causing the armature 75 together with the pilot-valve stem 125 to move downwardly due to the force of the springs 90 and 97, and the outlet of the control bore 109 is closed by the closing-off end 71. The pressure in the central bore 108 of the control body 101 rises and, together with the fuel pressure present in the bores 106, can move the intermediate part 115 momentarily away from the lower seat face 103 of the control body 101 against the force of spring 113. A larger throughflow cross-section of fuel to the control chamber 114 via the bores 106 and the annular space 117 than by means of the control bore 118 only is thereby available, thus bringing about an abrupt closing of the injection ports via the control piston 110.

The control device 100 corresponds essentially to the control device which is known from EP Patent Specification 0.426.205 and in which a rapid and clean closing-off of the injection event is carried out in the same way.

It would of course be possible, together with the control device 100, to use the solenoid valve 5 represented in FIGS. 1 and 2 for the fuel injection valve 2 or, conversely, to combine the control device 15 of the fuel injection valve shown in FIG. 1 with the solenoid valve 6 according to FIG. 5.

FIG. 6 represents a further embodiment of a solenoid valve 7, which could likewise be used both in conjunction with the control device 15 of the fuel injection valve 1 according to FIGS. 1 and 2 and in conjunction with the control device 100 of the fuel injection valve 2 according to FIG. 5. The pilot-valve stem 125 is essentially of the design shown in FIG. 5.

A valve head 141 is attached to the upper part 140 of the bore 77, the part 140 being wider than bore 77 and both being machined in the inner part 73 of the solenoid valve 7. A central bore 142 coaxial with the pilot-valve stem 125 is also provided. The bore 142 has at the lower end, a wider portion 143, into which a piston 145 is inserted so as to be closely slideable. A stud 146 of piston 145 is placed in the pilot-valve stem 125, which is axially displaceable together with the piston 145. A precompressed spring 150 is arranged in a bore 147 of the piston 145, the spring 150 being supported on a step 148. The spring 150 is precompressed by a setscrew 151 screwed into the valve head 141, and further provided with a guide stud 152. The setscrew 151 is assigned a spacer disc 153.

Formed underneath the piston 145 in the widened bore part 140 is a lower space 157 which is connected via a connecting bore 156 to the flow-off space 65 associated with the low-pressure part of the fuel injection valve.

An upper space located above the piston 145 is designated in FIG. 6 by the numeral 158. This upper space 158 is connected to the lower space 157 via a throttle bore 159.

Figure 7A:
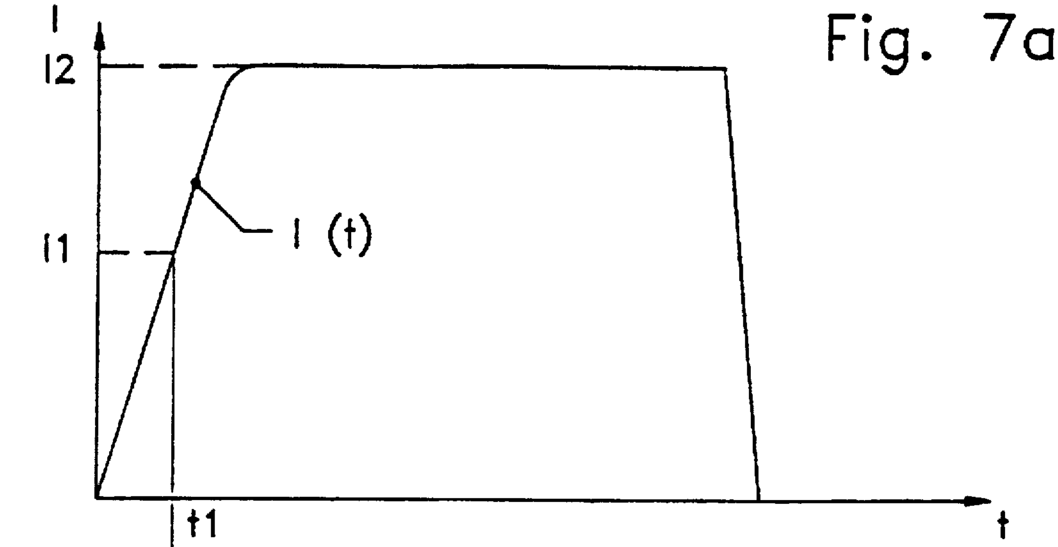
Figure 7B:
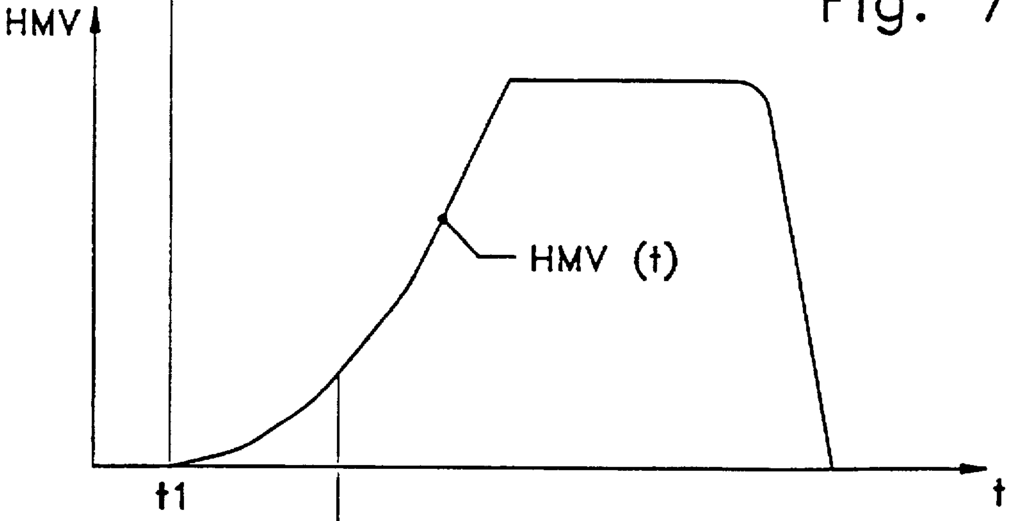
Figure 7C:
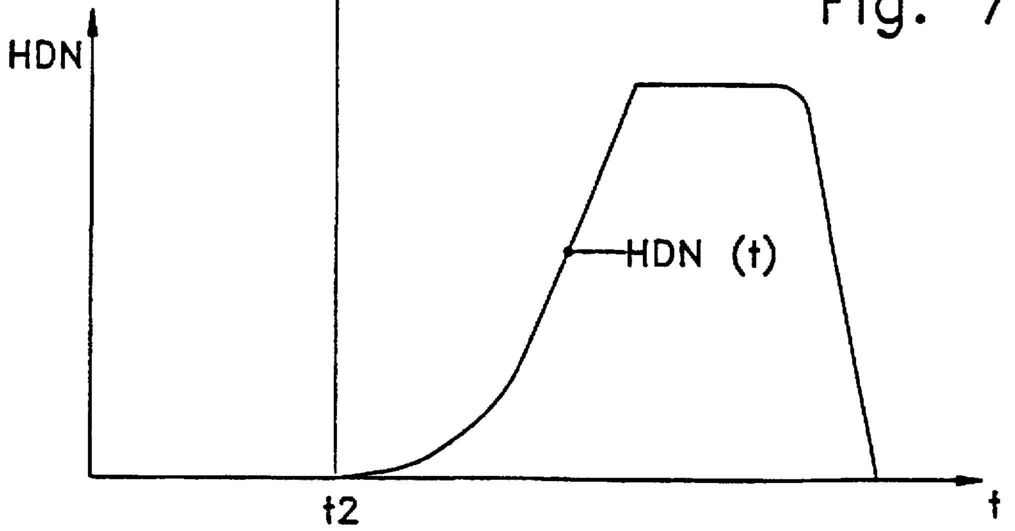

The mode of operation of the solenoid valve 7 according to FIG. 6 is now described together with the description of the diagrams represented in FIGS. 7*a*, 7*b* and 7*c* which, in a similar way to FIGS. 4*a*, 4*b*and 4*c*, show the time trend of the injection event in terms of current, the stroke of the solenoid valve and the stroke of the control piston or nozzle needle.

FIG. 6 represents again the closed position of the solenoid valve 7, in which the injection ports of the fuel injection valve are also closed in the way already described.

At a specific point in time, an electric control pulse is transmitted to the solenoid valve 7.

In FIG. 7*a*, when the current reaches a specific value I1, the pilot-valve stem 125, connected to the armature 75, begins to move upwardly as a result of the pull-up force of the electromagnet 74 (time t1 in FIGS. 7*a* and 7*b*). During this movement, not only the force of the spring 150 must be overcome, but the fuel in the space 158 above the piston 145 must also be displaced through the throttle bore 159 into the lower space 157, resulting in a delay in the complete raising of the closing-off end 71 from the end face 62 and a corresponding slow drop-off of the pressure in the control chamber. As a consequence, the control piston, and therefore also the nozzle needle, begin to move upwardly at a delayed time t2, thus initiating the injection event into the combustion chamber of the internal combustion engine. The initially slow movement of the nozzle needle is accelerated as soon as enough fuel has been displaced out of the space 158 and the pilot valve stem 125 has moved upwardly enough. When the supply of current to the solenoid valve 7 is interrupted to terminate the injection event, the pilot-valve stem 125 along with the armature 75, onto which a pull-up force is no longer exerted, together with the piston 145, are shifted back to the closed position by the spring 150. The volume of the upper space 158 is thereby brought to the original size, thus leading to a momentary vacuum pressure in the space 158. Due to the pressure differential between the lower space 157 and the upper space 158, fuel will pass through the throttle bore 159 back into the upper space 158. Enough time is available in this case to refill the space 158 with fuel, since the time during which the valve remains closed is approximately 20 times longer than the duration of the injection event. The mentioned pressure differential is usually about one bar, since normally atmospheric pressure prevails in the fuel return port 11. If this pressure differential is not sufficiently high for reliable operation, the pressure in the fuel return port 11 can be increased to 2 or 3 bar.

FIGS. 8, 9 and 10 show in more detail the flat-seat design between the closing-off end 71 of the solenoid valve and the upper end face 62 of the control bodies described, the said upper end face 62 cooperating with the closing-off end 71. Part of the control body 101 according to FIG. 5 is shown as an example; however, the flat-seat design according to the invention could be adopted advantageously in all fuel injection valves known hitherto.

The end face 62 is provided with an annular relief depression or end-face groove 163, by which an annular sealing surface 162 of smaller diameter, surrounding the outlet of the control bore 109, is limited. The outside diameter of the end-face groove 163 is smaller than the diameter of the closing-off end 71, resulting in an annular seat surface 164 (lying in the same plane as the sealing surface 162) which is interrupted only by, if appropriate, two groove-like relief outlets 165 opening into the annular end-face groove 163. The relief outlets 165, arranged symmetrically here and produced as a groove, extend beyond the diameter of the closing-off end 71. Both the end-face groove 163 and the relief outlets 165 can be fabricated using mechanical cutting machining, by stamping, by electro-erosion or by the chemical stripping of material.

Limitations in the fabrication of flat seats cannot guarantee a complete seal. If fuel at high pressure creeps under such as a flat seat, considerable forces result. These forces endeavor to lift off the closing-off end 71 from the end surface 62, thus leading to greatly increased leakage. In accordance with the invention, the sealing face 162 on which the fuel pressure acts now has a small diameter, and because the fuel can escape via the relief outlets 165 with a pressure loss, the hydraulic forces are therefore kept as low as possible so that the solenoid valve which controls these forces can also be made as small as possible. If a smaller magnet is sufficient for this control, less space is taken up, a more rapid mode of operation is achieved and the solenoid valve is less expensive.

When the outlet is closed abruptly, a small sealing surface is exposed to a high mechanical stress. This stress is reduced considerably by the addition of the seat surface 164 which, in addition to the sealing surface 162, absorbs the mechanical forces.

As an alternative, it is also possible to manufacture the sealing surface, the annular end-face groove, the seat face and the relief outlets in the closing-off end 71 instead of in the control body.

Instead of a solenoid valve 5, 6, 7 as described, with which the pilot valve stem 70, 125 is moved by electromagnetic forces, other types of actuating devices, in particular piezo-electric actuating elements, can be used which are capable of controlling the injection operation, as described in connection with the various embodiments.

I claim:

1. A fuel injection valve for intermittent injection of fuel into the combustion chamber of an internal combustion engine, comprising:

a housing;

a valve-seat provided with at least one injection port;

an injection-valve member mounted in said housing so as to be longitudinally displaceable for the closing or opening of said at least one injection port;

a hydraulic control device for controlling the movement of said injection-valve member, said control device comprising a control port;

an electrically actuatable solenoid valve having a pilot-valve stem movable between a closing-off position and an opening position, said pilot-valve stem in its closing-off position closes off said control port;

said solenoid valve further comprising a solenoid body having an outer part and an inner part, a solenoid coil arranged in a space provided in said solenoid body and defined by said outer part and said inner part and an armature connected to said pilot valve stem; and securing means for securing said solenoid valve to said housing, said securing means comprising said outer part of said solenoid body, said outer part being attached to said housing and constituting at least partially part of the magnetic circuit of said solenoid valve.

2. The fuel injection valve according to claim 1, wherein:

said armature is displaceably arranged in a bore of said outer part and surrounded by a section of said outer part which section forms part of the magnetic circuit of said solenoid valve, said inner part having a pole face arranged opposite an end face of said armature.

3. The fuel injection valve according to claim 1, wherein:

said outer solenoid part attached to said housing surrounds said inner solenoid part and is in engagement with said inner solenoid part.

4. The fuel injection valve according to claim 1, further comprising:

a body member arranged within said housing, said control port being provided in said body member, said body member being fixed in place between said housing and said outer solenoid part.

5. The fuel injection valve according to claim 4, wherein:

said body member is provided with a flange, said flange being pressed against said housing by said outer solenoid part.

6. The fuel injection valve according to claim 1, wherein:

said hydraulic control device further comprises a control piston arranged to be longitudinally displaceable and operatively connected to said injection-valve member which is subject to a fuel system pressure from a high-pressure supply conduit, said control piston being subject to a fuel control pressure in a control chamber, said control chamber being connected to the high-pressure supply conduit via at least a further second control port, the control pressure in the control chamber being controllable by the opening or closing of said first control port.

7. The fuel injection valve according to claim 1, wherein:

said pilot valve stem is guided in said inner part.

8. The fuel injection valve according to claim 1, wherein:

the entire outer part is made of the same material.

9. The fuel injection valve according to claim 5, wherein:

said flange is pressed against an end surface of said housing.

* * * * *